United States Patent
Zook et al.

(10) Patent No.: US 7,645,840 B2
(45) Date of Patent: Jan. 12, 2010

(54) FROZEN, LIGHTWEIGHT CURABLE SEALANT

(75) Inventors: Jonathan D. Zook, Santa Clarita, CA (US); Dewey L. Mullins, Marietta, GA (US); Stephane Pyrek, Redondo, CA (US); David W. Jordan, Northridge, CA (US)

(73) Assignee: Advanced Chemistry and Technology, Inc., Garden Grove, CA (US)

( * ) Notice: Subject to any disclaimer, the term of this patent is extended or adjusted under 35 U.S.C. 154(b) by 226 days.

(21) Appl. No.: 10/965,393

(22) Filed: Oct. 14, 2004

(65) Prior Publication Data

US 2005/0148741 A1    Jul. 7, 2005

Related U.S. Application Data

(63) Continuation-in-part of application No. 10/369,407, filed on Feb. 20, 2003, now Pat. No. 6,881,462.

(60) Provisional application No. 60/510,975, filed on Oct. 14, 2003, provisional application No. 60/360,555, filed on Feb. 26, 2002.

(51) Int. Cl.
*C08L 81/00* (2006.01)
*B65D 71/00* (2006.01)

(52) U.S. Cl. .................. 525/535; 428/351; 428/352; 428/419; 428/704; 206/223

(58) Field of Classification Search .............. None
See application file for complete search history.

(56) References Cited

U.S. PATENT DOCUMENTS

| | | | | |
|---|---|---|---|---|
| 2,466,963 A | * | 4/1949 | Patrick et al. | 528/387 |
| 3,247,138 A | * | 4/1966 | Jorczak et al. | 528/374 |
| 3,519,250 A | | 7/1970 | Tibbs et al. | 259/72 |
| 3,659,896 A | | 5/1972 | Smith et al. | 296/93 |
| 3,708,379 A | | 1/1973 | Flint | 161/36 |
| 3,976,530 A | | 8/1976 | Callan | 156/306 |
| 4,060,570 A | * | 11/1977 | Paul, 3rd | 524/525 |
| 4,116,742 A | | 9/1978 | Firth | 156/289 |
| T991,001 I4 | | 3/1980 | Donovan et al. | 428/40 |
| RE30,843 E | | 1/1982 | Flint | 428/48 |
| 4,366,307 A | | 12/1982 | Singh et al. | 528/373 |
| 4,368,086 A | | 1/1983 | Villemain | 156/93 |
| 4,664,168 A | | 5/1987 | Hong et al. | 152/504 |
| 4,816,101 A | | 3/1989 | Hong et al. | 156/244.11 |
| 4,866,108 A | | 9/1989 | Vachon et al. | 523/428 |
| 5,423,996 A | * | 6/1995 | Salyer | 252/70 |
| 5,663,219 A | * | 9/1997 | Chokshi et al. | 523/404 |
| 5,709,715 A | * | 1/1998 | Guidotti et al. | 8/115.51 |

(Continued)

FOREIGN PATENT DOCUMENTS

JP    06272407    11/1994

*Primary Examiner*—James Seidleck
*Assistant Examiner*—John J Figueroa
(74) *Attorney, Agent, or Firm*—Gifford, Krass, Sprinkle, Anderson & Citkowski, P.C.

(57) ABSTRACT

A uniformly premixed sealant is extruded into a packaging form and allowed to pressure equilibrate prior to freezing. Upon warming the sealant begins to cure. The storage of the preformed sealant formulation under cold conditions arrests the activity of cure catalysts and accelerators mixed therethrough. The sealant is readily extruded into a preform shape containing a lightweight filler. A release film is provided to avoid contact with the sealant preformed in a shape during application to a substrate.

22 Claims, 1 Drawing Sheet

U.S. PATENT DOCUMENTS

| | | | | |
|---|---|---|---|---|
| 5,929,141 A * | 7/1999 | Lau et al. | | 523/458 |
| 6,059,457 A | 5/2000 | Sprehe et al. | | 383/63 |
| 6,176,452 B1 | 1/2001 | Gallegos | | 244/135 B |
| 6,486,268 B2 * | 11/2002 | Zook et al. | | 525/535 |
| 6,486,297 B2 * | 11/2002 | Zook et al. | | 528/373 |
| 6,881,462 B2 * | 4/2005 | Mullins et al. | | 428/41.8 |
| 2001/0051260 A1 | 12/2001 | Johnson et al. | | 428/317.7 |

* cited by examiner

FROZEN, LIGHTWEIGHT CURABLE SEALANT

RELATED APPLICATIONS

This application is a continuation-in-part of U.S. patent application Ser. No. 10/369,407 filed Feb. 20, 2003, which claims priority of Provisional Patent Application No. 60/360,555 filed Feb. 26, 2002. This application also claims priority of Provisional Patent Application No. 60/510,975 filed Oct. 14, 2003, which is incorporated herein by reference.

FIELD OF THE INVENTION

The present invention relates to multi-component, ambient curing sealant and adhesive compositions suitable for use in sealing and/or bonding components and, more particularly, to methods of sealing aircraft subassemblies using preformed, curable sealant.

BACKGROUND OF THE INVENTION

Thiol-terminated sulfur-containing polymers have a long history of use in aerospace sealants because of their fuel resistant nature upon cross-linking. Among the commercially available polymeric compounds having sufficient sulfur content to exhibit this desirable property are the polysulfide polymers described, e.g., in U.S. Pat. No. 2,466,963 and sold under the trade name Thioplast® polysulfide (Akcros Chemicals, Germany); U.S. Pat. No. 4,366,307 sold in complete sealant formulations by PRC-DeSoto International, Inc. of Glendale, Calif.; and PCT/US01/07736, PCT/US01/07737, and PCT/US01/07738. In addition to fuel resistance, polymers useful in this context must also have the desirable properties of low temperature flexibility, liquidity at room temperature, high temperature resistance, a reasonable cost of manufacture, and not be so malodorous as to prevent commercial acceptance of compositions that contain the subject polymers.

An additional desirable combination of properties for aerospace sealants which is much more difficult to obtain is the combination of long application time (i.e., the time during which the sealant remains usable) and short curing time (the time required to reach a predetermined strength). Singh et al., U.S. Pat. No. 4,366,307, disclose such materials. Singh et al. teach the acid-catalyzed condensation of hydroxyl-functional thioethers. The hydroxyl groups are in the beta-position with respect to a sulfur atom for increased condensation reactivity. The Singh et al. patent also teaches the use of hydroxyl-functional thioethers with pendent methyl groups to afford polymers having good flexibility and liquidity. However, the disclosed condensation reaction has a maximum yield of about 75% of the desired condensation product. Furthermore, the acid-catalyzed reaction of β-hydroxysulfide monomers yields significant quantities (typically not less than about 25%) of an aqueous solution of thermally stable and highly malodorous cyclic byproducts, such as 1-thia-4-oxa-cyclohexane. As a result, the commercial viability of the disclosed polymers is limited.

Another desirable feature in polymers suitable for use in aerospace sealants is high temperature resistance. Inclusion of covalently bonded sulfur atoms in organic polymers has been shown to enhance high temperature performance. However, in the polysulfide polyformal polymers disclosed in U.S. Pat. No. 2,466,963, the multiple —S—S— linkages result in compromised thermal resistance. In the polymers of Singh et al., U.S. Pat. No. 4,366,307, enhanced thermal stability is achieved through replacement of polysulfide linkages with polythioether (—S—) linkages. In practice, however, the disclosed materials also have compromised thermal resistance due to traces of the residual acid condensation catalyst.

Yet another desirable feature of materials useful as aircraft sealants is the ability of the polymeric system to cure or cross-link under ambient conditions. For the purposes of this application, the term "ambient conditions" refers to temperatures and humidity levels typically encountered in an aircraft manufacturing environment. Numerous potentially useful cross-linking reactions occur at ambient conditions.

To achieve the required blend of application and performance properties, current commercial products are usually multi-component sealants. Widely accepted aerospace sealants consist of a first component containing at least one ungelled thiol terminated sulfur containing polymer and a second component containing either an oxidizing compound, e.g., manganese dioxide or any of a variety of Cr(VI) compounds, or a thiol reactive material, e.g. a polyepoxide, polyene or polyisocyanate. Optionally, both the first and second components also contain one or more formulating ingredients chosen from the list of fillers, pigments, plasticizers, stabilizers, catalysts, activators, surface-active compounds, solvents, and adhesion promoters. The types and quantities of these later ingredients are chosen and adjusted such that specific properties are achieved. Any of a number of other reactive groups, e.g., hydroxyl-, amine-, acryloxy-, siloxy- and maleimide, may be introduced onto the sulfur containing polymer backbone. By proper choice of ambient curing chemistry, these alternative reactive groups may be equally substituted for the aforementioned thiol functionality.

Polysulfide sealants may also be supplied in two-part injection kits, such as those manufactured by Techcon Industries and sold under the trade name Techkit, or in single component cartridges as premixed and frozen sealant (PMF). PMF sealants are highly desired by end users as they eliminate the tedious and costly process of on-site mixing as well as providing the end user with the convenience of a one-component material that has the fast cure rate typical of a two-component sealant.

Currently, the construction of both small- and large-scale aircraft sub-assemblies is entirely a manual operation. The quality and integrity of the sealed joint or seam is totally reliant on the skill and ability of the sealing operator to: correctly and thoroughly measure and mix the different sealant components; correctly apply the requisite amount of sealant for each bond-line requiring sealing; and reproducibly, over time, repeat this process on every sub-assembly requiring sealing.

In addition, it is highly desirable for each and every sealing operator to seal each and every sub-assembly in exactly the same manner. In practice, airframe manufacturers have addressed this challenge through comprehensive training programs, detailed sealing procedures and numerous in-process inspections. Despite these efforts, defects are common and resealing requires removing the part from the assembly-line process, an action that substantially diminishes manufacturing efficiency.

Aircraft manufacturers, in an effort to increase the fuel economy, attempt to reduce the weight of every aircraft component. Sealant manufacturers have responded to this demand for lower density sealants by incorporating lightweight fillers. The lightweight fillers suitable for use in aerospace applications may be classified as being organic, inorganic, or a hybrid composition. The particle morphology falls within two categories—hollow microspheres and amorphous filler particles.

The manufacture of premixed and frozen lightweight sealants is a relatively new, and not well understood, process. To those skilled in the art, the longstanding process for preparing a premixed and frozen polysulfide sealant involves the pumping of the base and curing agent components, in the proper mix ratio, into a rotary mixing chamber. The mixed sealant is then extruded into cartridges that are flash frozen to a temperature below the liquid sealant's glass transition temperature. This flash freezing process step is accomplished by immediately placing the sealant cartridge into a dry ice bath or into a liquid nitrogen freezing chamber.

Unexpectedly, when premixed and frozen lightweight sealants are prepared, it is known that many of the physical properties of the thawed sealant are degraded. Thus, there exists a need for a process to produce premixed and frozen low density aerospace sealants having resistance to mercaptan-containing aviation fuels. An additional need exists for a sealant that reduces labor and variability while affording ambient cure, shelf stability and light weight.

SUMMARY OF THE INVENTION

A premixed frozen sealant is prepared by mixing sealant components including a curable prepolymer and a curing agent to form a substantially uniform premix. The premix is extruded into a packaging form and allowed a pressure equilibration rest prior to freezing. The premix is optionally extruded into a preform shape in contact with a release film.

A preformed sealant package includes a curable uniformly premixed one-part sealant formulation which contains a lightweight filler and is preformed to a shape adapted to secure to a substrate. A release film is in contact with the formulation. A commercial package includes such preformed sealant package along with instructions for the application of the preformed sealant to a substrate and allowing the sealant formulation to warm to a temperature-inducing cure.

DETAILED DESCRIPTION OF THE PREFERRED EMBODIMENTS

Figure 1:
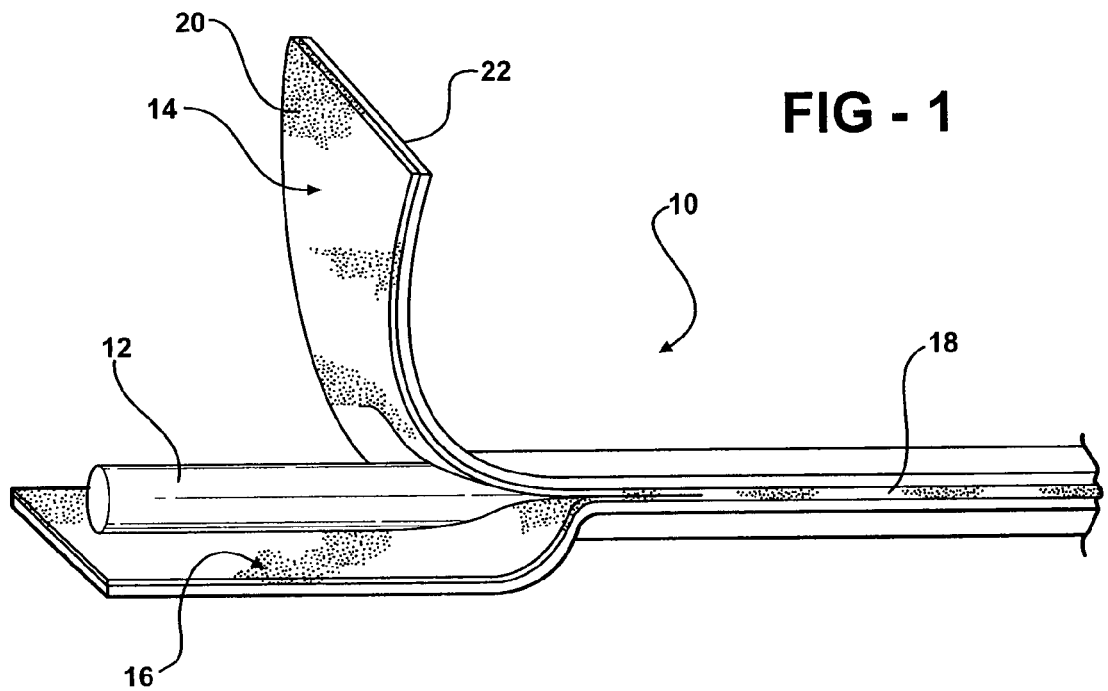
FIG. 1 is a perspective view of a preformed sealant package according to the present invention where the relative dimensions of release film layers are distorted for illustrative purposes.

The present invention satisfies a long-felt need in the aerospace industry by providing a uniformly premixed lightweight frozen sealant particularly well suited to sulfur-containing sealants. The sealant is optionally formed as a frozen preform that upon warming cures in the preform shape as compressed against a substrate. This invention accommodates the many types and shapes of bond-lines as well as the differing substrates now in use. Additionally, the present invention satisfies the various performance requirements now delivered by conventional aerospace sealants, while obviating the difficulties in obtaining a sealant with both a long work life and a short cure time. The present invention includes the method of mixing and degassing a multi-component sealant formulation to yield a material that will cure absent further mixing or the addition of other components. The premixed sealant formulation is allowed a pressure equilibration rest period prior to flash freezing. The formulation is optionally preformed into a desired shape prior to being frozen.

The present invention is described herein with respect to sulfur-containing lightweight sealants. Operative examples illustratively include manganese dioxide and polysulfide, epoxy cured polysulfide, epoxy cured polythioethers, isocyanate cured polysulfide, and isocyanate cured polythioethers and in particular isocyanate cured hydroxyl terminated polythioether. It is also appreciated that the invention is also well suited for other polymeric adhesive or coating systems illustratively including polysiloxane, fluoropolymers, epoxies, polyurethanes, polyesters, polythioethers, acrylates, and phenolics.

A base sealant composition is formed from a polymerizable sulfur-containing prepolymer such as those disclosed in U.S. Pat. No. 2,466,963, which is incorporated herein by reference. A plasticizer is preferably added to improve working properties. Plasticizers conventional to the art are operative herein and illustratively include aliphatic oils, waxes, fatty acid salts, and resins derived from alkylated phenols and esters. While the amount of plasticizer present is not critical and indeed depends on variables illustratively including the molecular weight of the seal precursors and the physical requirements of the cured adhesive, in general the plasticizer is present from 0 up to about 40 parts by weight based upon sealant precursor weight. It is further appreciated that a plurality of compatible plasticizers are operative herein.

To promote adhesion, resole phenolic resins may be used as described in U.S. Pat. No. 5,516,843. Typical phenolic resin additives are Methylon AP-108, Durez 16674, Bakelite BRL 3741, and Resinex 468. Bulk fillers are used to increase strength, impart needed rheological properties, reduce the cost or modify the density of the sealant. Tensile properties can be increased significantly, depending on the type of bulk filler, its particle size, and the type of cure. Typical bulk fillers include calcium carbonate (wet or dry ground limestone, precipitated), carbon blacks (furnace, thermal), calcined clay, talc, silica and silicate fillers, and rutile titanium dioxide. Bulk fillers most typically occupy around 40 weight percent of the sealant composition, but useful products may be obtained from materials containing from 2 to 80% by weight bulk fillers. Fillers also provide the multi-part uniform mixture with physical properties helpful in adjusting the extrudability of the adhesive preform. Since the adhesive precursors are often low molecular weight liquids up to 10,000 Daltons, the fillers are optionally incorporated into the two-part mixed composition to produce a thicker, easily extruded mass.

Pigments are also optionally included in the preformed sealant mixture. Pigments illustratively include titanium dioxide, zinc sulfide, carbon black and various organic and inorganic substances known to the art.

In order to lower sealant density, a lightweight filler is added. The lightweight fillers are typically hollow microspheres, amorphous materials or aerogels. The specific gravity of the microspheres ranges from about 0.1 to about 0.7 and are exemplified by polystyrene foam, microspheres of polyacrylates and polyolefins, and silica microspheres having particle sizes ranging from 5 to 100 microns and a specific gravity of 0.25 sold under the trademark ECCOSPHERES by W.R. Grace & Co. Other examples include alumina/silica microspheres having particle sizes in the range of 5 to 300 microns and a specific gravity of 0.7 sold under the trademark FILLITE by Pluess-Stauffer International, aluminum silicate microspheres having a specific gravity of from about 0.45 to about 0.7 sold under the trademark Z-LIGHT, and calcium carbonate-coated polyvinylidene copolymer microspheres having a specific gravity of 0.13 which are sold under the trademark DUALITE 6001AE by Pierce & Stevens Corp.

The amorphous lightweight fillers typically have a specific gravity ranging from about 1.0 to about 2.2, while an aerogel has a specific gravity of from 0.05 to 0.07. The amorphous lightweight fillers are exemplified by calcium silicates, fumed silica, precipitated silica, and polyethylene. Examples include calcium silicate having a specific gravity of from 2.1 to 2.2 and a particle size of from 3 to 4 microns sold under the trademark HUBERSORB HS-600 by J.M. Huber Corp., and fumed silica having a specific gravity of 1.7 to 1.8 with a particle size less than 1 micron sold under the trademark CAB-O-SIL TS-720 by Cabot Corp. Other examples include precipitated silica having a specific gravity of from 2 to 2.1 sold under the trademark HI-SIL T-7000 by PPG Industries, and polyethylene having a specific gravity of from 1 to 1.1 and a particle size of from 10 to 20 microns sold under the trademark SHAMROCK S-395 by Shamrock Technologies Inc. The amounts of the microspheric and amorphous lightweight fillers used in the lightweight sealant may be from about 0.3 to about 10% and from about 4% to about 15% of the total weight of the sealant, respectively.

Only recently, the specific gravity of aerospace sealants has been reduced from the 1.6-1.8 range down to a minimum of approximately 1.0. Those skilled in the art have reached this specific gravity by incorporating fine hollow spheres and compensating for the loss in physical strength by additions of more highly reinforcing fillers and pigments such as precipitated calcium carbonate or fumed silica.

Liquid polysulfide prepolymers operative in the present invention are most typically cured by oxidizing the polymer's thiol (—SH) terminals to disulfide (—S—S—) bonds. The curing agents most commonly used are oxygen donating materials, preferably manganese dioxide, lead dioxide, calcium peroxide, zinc peroxide, cumene hydroperoxide, p-quinone dioxime and mixtures thereof. Most preferred is manganese dioxide. Lower valence metallic oxide, other organic peroxides, metallic paint dryers and aldehydes may also function as curatives. The curing compound as the principal component of the second part of the composition of the present invention may be suspended in an inert organic plasticizer, such as HB-40, which is a hydrogenated perphenyl from Monsanto Corp., St. Louis, Mo., reaction modifiers and viscosity modifiers.

The first part or base compound and second part, curing agent, are combined in a fixed and prescribed weight ratio in a range from about 14:1 to about 5:1, preferably about 10:1 (first part to second part), to produce the sealant. The sealant can be applied to the metal substrate by most conventional methods. These include spraying, brushing and extruding using two-part room temperature meter-mix equipment to combine the components in the exact ratio. Hand mixing is also acceptable for sealant supplied in pints, quarts and gallon kits.

Freezing the sealant mixture immediately after combination of the prepolymer, first part and curing agent, second part precludes an end user from having to assure homogenous mixing at the point of use. Additionally, premixed and frozen sealant is optionally preformed in a variety of shapes such as sheets and ribbons thereby allowing for a more uniform and rapid application to a given substrate, as compared to extrusion from a dispensing tube.

According to the present invention, subsequent to mixing and packaging, a pressure equilibration rest period is added to the process prior to flash freezing. While the mechanism is unknown, it is believed that sealants typically require at least 10 atmospheres of pressure to be pumped through the meter mixing equipment. The pressure equilibration process step allows the "hollow" filler particles to expand to near their original volume before the flash freezing process begins. It is appreciated that equilibration to ambient atmosphere can also be expedited by pulling a partial vacuum about the sealant.

The pressure equilibrium rest period typically lasts from 2 to 15 minutes and depends on variables illustratively including filler identity, filler quantity, sealant mixture viscosity, and meter mixing pressure. It is appreciated that longer rest periods are operative herein so long as cure time is adjusted accordingly through modification of curing agent identity and/or concentration in the sealant mixture.

Figure 2:
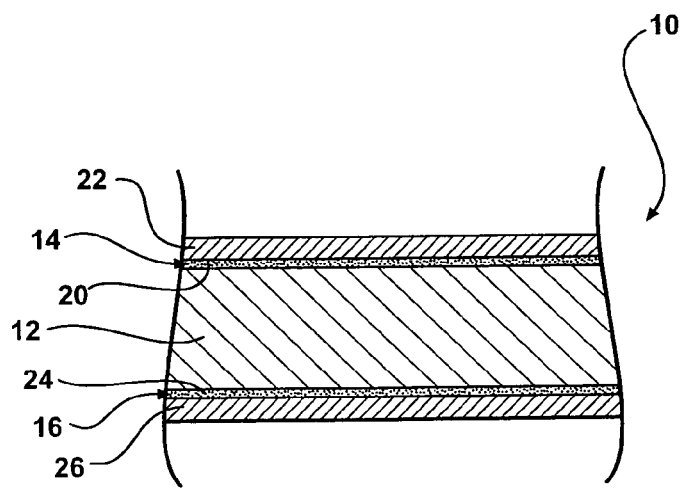
FIG. 2 is a longitudinal cross-section of the inventive package depicted in FIG. 1.
Figure 3:
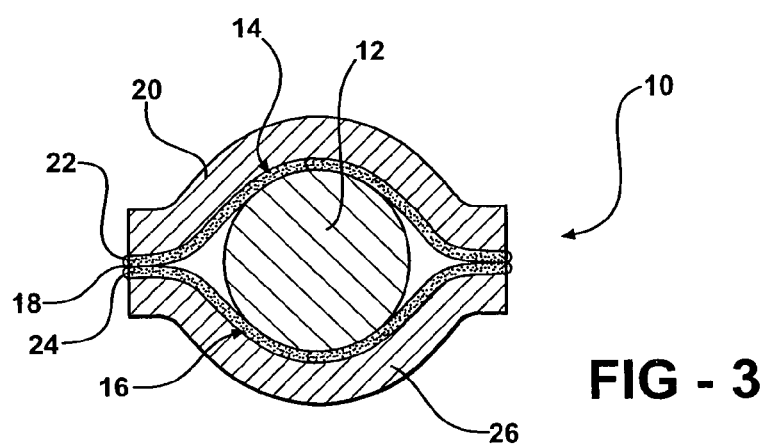
FIG. 3 is a transverse cross-section of the inventive package depicted in FIG. 1.

Referring now to FIGS. 1-3, an inventive commercial package is shown generally at 10. A premixed sealant formulation is formed by extrusion into a preformed sealant 12. It is appreciated that in addition to extrusion, a preformed sealant is produced by molding, casting, die-cutting, and the like. In a preferred embodiment an inventive preform is created that is independent of reinforcing metal or fabric woven mesh reinforcement, as such a mesh tends to limit the deformability to provide a press-fit workable seal. The sealant 12 is applied onto a first release film 14. Typical preformed sealant thickness as measured perpendicular to an adherent substrate thereto ranges from about 1 mm to 10 mm; however, it is appreciated that dimensions beyond this range are also operative herein. Optionally, the release film 14 is composed of a sealant contacting layer 20 laminated to one or more structural layers 22. The first release film 14 is peeled from the preformed sealant 12 and the sealant 12 applied to a substrate. Preferably, an inventive preformed sealant 12 is sandwiched between the first release film 14 and a second like release film 16 to aid in seal alignment and to minimize handling thereof. It is appreciated that the second release film 16 is likewise optionally composed of a sealant contacting layer 24 and one or more structural or external environment barrier layers 26 as detailed above with respect to the first release film 14. Optionally, a bond 18 is provided by conventional means between release films to create a barrier encasing a preformed sealant. The bond 18 being between portions of the first release film when only a single film is present or between opposing edges of the first release film 14 and the second film 16 in a dual release film embodiment depicted in FIGS. 1 and 3. The bond is formed through the application of conventional adhesive, thermal bonding, sonic bonding or the like.

The preformed sealant 12 is a substantially uniform mixture of precise stoichiometry that cures upon thaw. Cure typically occurs after warming the preformed sealant to above about −60° C. to 4° C. Preferably, the preformed sealant according to the present invention is packaged and stored with a cold pack having a melting temperature less than the cure temperature of the sealant in order to maintain the preformed sealant in an uncured state upon temporary interruption of cold storage conditions.

The nature of the curable sealant composition utilized herein is largely dictated by the resulting seal performance requirements. In a preferred aerospace embodiment, the sealant is a polythioether or polysulfide polymer.

Various fillers are also optionally incorporated into the preformed sealant. Useful fillers illustratively include clay, talc, carbon black, silica and calcium carbonate.

At the point of use, an inventive commercial package is taken from cold storage and used according to instructions that include the frozen preformed sealant is separated from the release film and is applied to a substrate with a consistency from tack-free to putty-like solid. The working time for the preformed sealant is utilized to shape and otherwise compression conform the extrudate to a desired form against a substrate. An optional second release film is removed after final forming. An additional substrate then optionally is brought into contact with the preformed sealant to create a bond line. The sealant is then thawed to a temperature sufficient to initiate the cure process. The substrate relative position is maintained during cure to a completed seal. It is appreciated that the preformed sealant can be formed in a variety of shapes illustratively including ribbons, discs, sheets, cones, and more complex three-dimensional forms. Preferably, the preformed sealant has a uniform dimension and weight per unit length. While ambient air atmosphere cure is common, it is also appreciated that curing ovens, vacuum ovens and other conventional cure conditions are also operative herewith.

All patents and published applications disclosed herein are indicative of the skill in the art. These patents and applications are herein incorporated by reference to the same extent as if each were specifically and individually incorporated by reference.

The foregoing description is illustrative of particular embodiments of the invention, but is not meant to be a limitation upon the practice thereof. The following claims, including all equivalents thereof, are intended to define the scope of the invention.

The invention claimed is:

1. A preformed sealant package comprising:
a curable uniformly premixed one-pan sealant formulation frozen at a temperature to preclude cure after a pressure equalization rest period comprising an amorphous lightweight filler having a specific gravity of 1.0 to 2.2 or an aerogel having a specific gravity of 0.05 to 0.07 and preformed to a shape adapted to secure to a substrate; and
a first release film in contact with said formulation, and wherein said sealant formulation comprises a polysulfide.

2. The package of claim 1 further comprising a bond on said first release film creating a barrier encasing said sealant formulation.

3. The package of claim 1 further comprising a second release film in contact with said formulation.

4. The package of claim 3 wherein said first release film is in simultaneous contact with said formulation and said second release film.

5. The package of claim 4 further comprising a bond at a point of contact between said first release film and said second release film.

6. The package of claim 1 wherein said first release film comprises a sealant contacting layer laminated to at least one structural layer.

7. The package of claim 1 wherein said shape is selected from the group consisting of: ribbon, disc, sheet, and cone.

8. The package of claim 1 wherein the sealant formulation further comprises at least one additive selected from the group consisting of a plasticizer, a bulk filler, and a pigment.

9. The package of claim 1 farther comprising a cold pack.

10. A commercial package comprising: a premixed, frozen one-part sealant formulation preformed into a shape at a temperature to preclude cure after a pressure equalization rest period arid comprising an amorphous lightweight filler, an aerogel lightweight filler, or a hollow microsphere lightweight filler having a specific gravity of between 0.1 and 0.7 along with instructions for the use thereof as a sealant, and wherein said sealant formulation comprises a polysulfide.

11. The commercial package of claim 10 wherein the sealant formulation further comprises at least one additive selected from the group consisting of a plasticizer, a bulk filler, and a pigment.

12. The commercial package of claim 10 further comprising a first release film in contact with the sealant formulation.

13. The commercial package of claim 12 further comprising a second release film in contact with the sealant formulation, 14. The commercial package of claim 10 further comprising a cold pack.

15. A preformed sealant package comprising:
a curable uniformly premixed one-part sealant formulation frozen at a temperature to preclude cure after a pressure equalization rest period comprising an amorphous lightweight filler having a hollow microsphere lightweight filler having a specific gravity of 0.1 to 0.7 and preformed to a shape adapted to secure to a substrate; and
a first release film in contact with said formulation, And wherein said sealant formula comprises a polysulfide.

16. The package of claim 15 further comprising a bond on said first release film creating a barrier encasing said sealant formulation.

17. The package of claim 15 further comprising a second release film in contact with said formulation.

18. The package of claim 17 wherein said first release film is in simultaneous contact with said formulation and said second release film.

19. The package of claim 15 wherein said first release film comprises a sealant contacting layer laminated to at least one structural layer.

20. The package of claim 15 wherein said shape is selected from the group consisting of: ribbon, disc, sheet, and cone.

21. The package of claim 15 wherein the sealant formulation further comprises at least one additive selected from the group consisting of a plasticizer, a bulk filler, and a pigment.

22. The package of claim 15 further comprising a cold pack.

* * * * *

UNITED STATES PATENT AND TRADEMARK OFFICE
CERTIFICATE OF CORRECTION

PATENT NO. : 7,645,840 B2  
APPLICATION NO. : 10/965393  
DATED : January 12, 2010  
INVENTOR(S) : Zook et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Sixteenth Day of November, 2010

David J. Kappos  
*Director of the United States Patent and Trademark Office*